Figure 1:
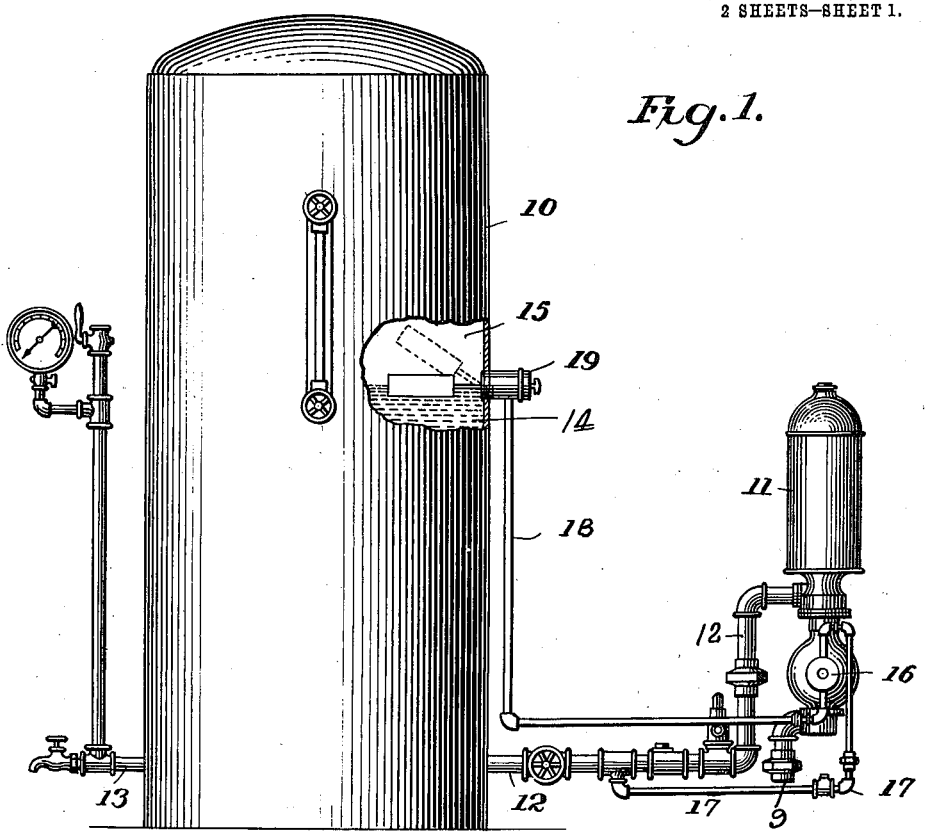

W. A. SHORB & G. R. RODGERS.
AIR REGULATOR.
APPLICATION FILED MAR. 26, 1910.

974,997.

Patented Nov. 8, 1910.

2 SHEETS—SHEET 1.

Inventors
William A. Shorb
Guy Reid Rodgers
By Meyers, Cushman &...
Attorney

Witnesses

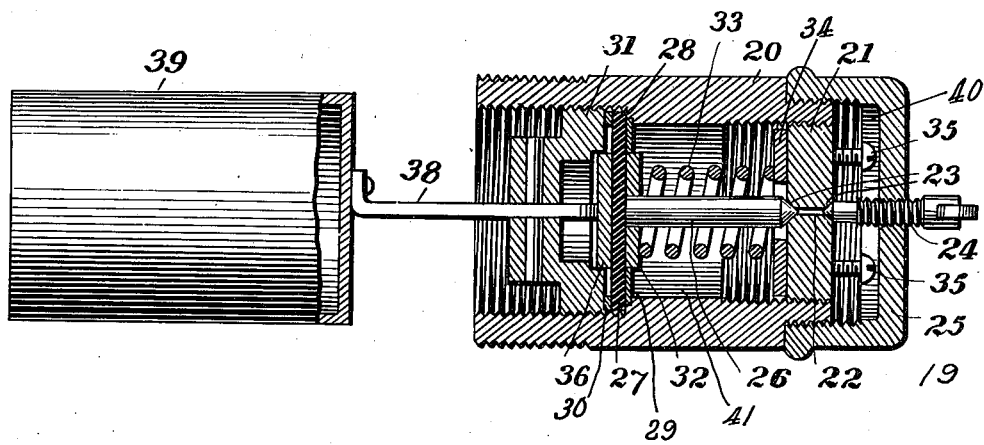
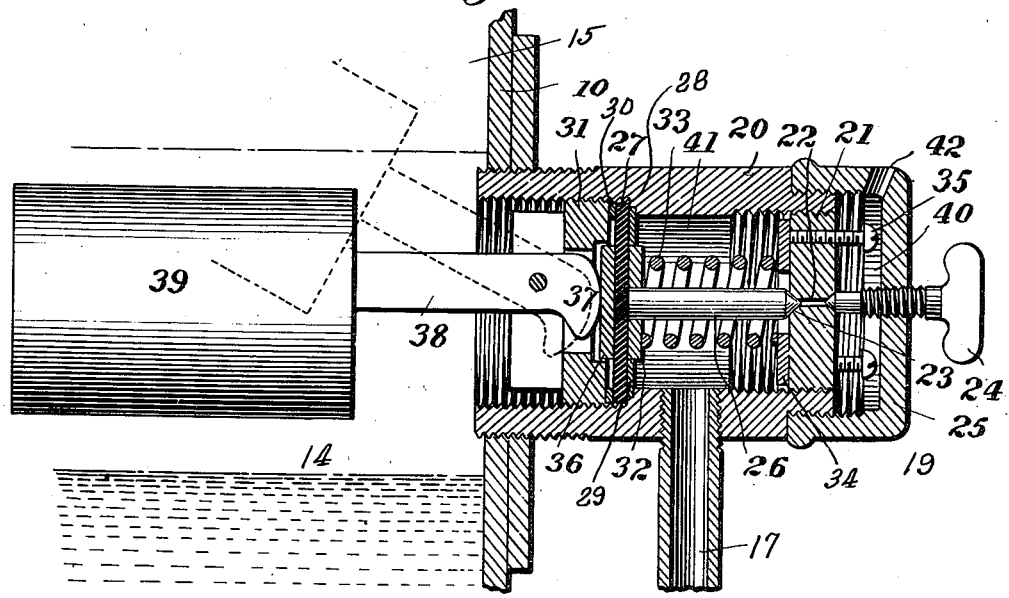

UNITED STATES PATENT OFFICE.

WILLIAM A. SHORB AND GUY R. RODGERS, OF DECATUR, ILLINOIS, ASSIGNORS TO LEADER IRON WORKS, OF DECATUR, ILLINOIS, A CORPORATION OF ILLINOIS.

AIR-REGULATOR.

974,997.  Specification of Letters Patent.  Patented Nov. 8, 1910.

Application filed March 26, 1910. Serial No. 551,649.

*To all whom it may concern:*

Be it known that we, WILLIAM ARTHUR SHORB and GUY REID RODGERS, citizens of the United States, residing at Decatur, in the county of Macon and State of Illinois, have invented new and useful Improvements in Air-Regulators, of which the following is a specification.

Our invention consists of the means for regulating the comparative volumes of air and water in the pressure supply tank of a compressed air water supply system. Although particularly adapted for use in this connection it will readily be seen, however, from our description following that the regulator of our invention is adapted for use in part or as a whole in other situations where an efficient regulator is required.

As is well known the compressed air systems common in use comprise a main supply tank of moderate size into which are forced air and water under pressure. These tanks with the water pump or water and air pumps are located at any convenient point, usually in the basement of a house or below the surface of the ground and out of sight in the vicinity of the well or other source of water supply. Water under pressure is led from the tank by suitable conduits to any point desired, the water being forced through the delivery pipes by the compressed air within the tank, the tank of the system being in effect a large auxiliary air chamber connected to the pumping system.

Considerable trouble arises in the use of a compressed air system, such as that described, on account of the fact that the relative volumes of air and water within the tank vary widely from several causes. In some systems no provision is made for introducing air into the tank other than the initial volume naturally filling it at atmospheric pressure, and in operation, under these conditions, the volume of air in the tank may so diminish, due to leakage or to absorption by the water which is subsequently forced out through the delivery pipes, that the air remaining in the tank will represent so small a proportion of the total cubical capacity that after having been operating under resultant pressures due to pumping in of the water the volume of air will not be sufficient to fill the tank when expanded to atmospheric pressure, thereby interfering with the expulsion or withdrawal of all of the water that has been pumped into the tanks.

It is essential for efficient service and greatest economy that the volume of air maintained within the tank be such as to entirely fill the tank at such pressure as to just about balance that due to a column of water of a height equivalent to the distance of lowest discharge outlet on the service pipe of system above the bottom of the tank, thus making it possible to draw all of the water which is pumped into tank, throughout the plumbing system connected therewith for useful service, and this requirement makes necessary the introduction of air additional in volume to and under higher pressure than, that naturally filling the tank at atmospheric pressure.

Many methods of introducing into the tank the additional amount of air required over that which will enter naturally and at atmospheric pressure are in use, common among which are separate air compressors operated by both hand and power; suction tubes fitted with proper valves and usually connected to the water pump which draws in air and causes it to intermingle with the water in the pump and eventually find its way into the tank through the discharge pipe of pump; and also by admitting into the suction pipe of the water pump, through a suitably controlled valve, air in small quantities, which is drawn in by the partial vacuum and is carried with the water through pump and discharge pipe of same into tank. It is plain that by all of these methods of introducing air, or by any other known to us at this time, that the relative volumes of air and water are very likely to become disproportioned, due not only to the tank leakage and water absorption, but also to the unregulated supply of air that may be introduced.

Attempts have been made to regulate the supply of air introduced as mentioned above by a valve operated by a float within the tank, which float rises and falls with the variation of the height of the surface of the water, opening the valve to admit air to the suction pipe of a pump as the water rises and stopping the admission of air by closing the valve as the water recedes. This means of regulation, however, fails to make use of the most important attribute of the fluids within the tank which is the pressure under which they are confined, since the resultant volume of air is proportional in a fixed ratio to a change in pressure, therefore, only such means of regulation as will be affected by pressure as well as volume may be depended upon to give satisfactory results.

It is the object of our invention to produce a regulator which will operate to automatically control the flow of air or other fluid to or from a suitable device for forcing same into a tank or other receptacle, where it will be confined, so that the relative volumes of air and water may be maintained in the tank in the desired working proportions.

In the accomplishment of our invention we provide for controlling the air supply (1) by means responsive to a variation of pressure within the tank and (2) by means responsive to changes in the volume of water within the tank.

In the best embodiment of our invention now known to us, which we shall now describe, we make use of a valve controlling the supply of air to an air compressor, and we control this valve jointly by a diaphragm responsive to variation of pressure within the tank, and by the elasticity of a spring suitably fixed and arranged with adjustable tension, and we provide for alternately locking said valve in a closed position or releasing it so that the spring may act to move it to an open position by a float responsive to the changes in water level. For purposes of illustration the valve is shown in the accompanying drawings connected into the system by suitable piping and controlling the supply of air to the suction side of an air compressor which is connected to operate in tandem with the water supply pump.

Figure 4:
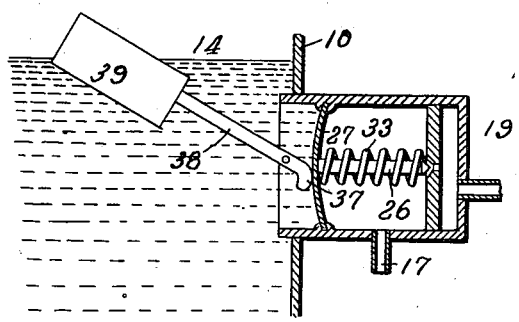
Figure 5:
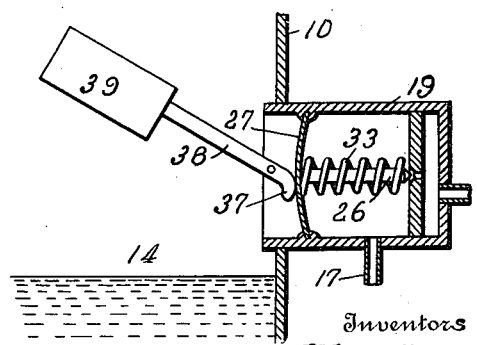

In the accompanying drawings,—Figure 1 is a somewhat diagrammatic view of a compressed air supply system in which our invention is embodied. Fig. 2 is a vertical section of the regulator of our invention showing its connection to the supply tank. Fig. 3 is a horizontal section of the same. Figs. 4 and 5 are diagrammatic views, showing the regulator in operating positions other than those shown in Figs. 2 and 3.

10 is a main supply or compressed air tank of this system, which is supplied with water by a pump 11 which may be operated automatically or otherwise in response to variation of some one or more conditions within the tank 10 to keep up the supply of water in the tank. This pump 11 is connected to a well, cistern, or other source of supply, by a suction pipe 9 and to the tank by a discharge pipe 12 while a service pipe 13 connected to the tank in the neighborhood of its bottom supplies water to house mains or other piping leading to suitable outlets.

The body of water in the tank is designated by 14, and above this body of water is a body of compressed air designated by 15. This body of air is at the same pressure as the body of water, but unlike the body of water it is elastic, and by its change of volume and pressure forces water from the tank through the delivery pipes. This air is replenished by an air pump 16 operating in tandem with the pump 11, and connected to the supply tank by an air discharge pipe 17 communicating with the water discharge pipe 12.

18 is a pipe through which the air pump draws its air supply, and it is this air supply or suction conduit of the pump which in this embodiment of our invention we control by a regulator. The regulator is indicated at 19. It consists of a cylindrical main casing 20 attached to the side of the tank and communicating with it about its middle. We have found that the location of the regulator at this point is most convenient, though it is entirely feasible to locate it at other points and would in fact be preferable under particular circumstances. In the outer end of the casing 20 is secured an air-tight dividing wall 21, provided with a central valve opening 22 having a seat 23 at each end. This valve opening is controlled jointly by two valve closures, the one 24 being mounted on a cap 25 inclosing the outer end of the casing 20 and being arranged for hand control, and the other of which 26 is mounted within the casing 20 on the opposite side of the wall 21 and is adapted for pressure control through the medium of a diaphragm 27 mounted transversely of the casing 20 and held in place against shoulder 28 by clamping rings 29 and 30, and a clamping member 31 screw-threaded into the end of the casing. The valve closure 26 is attached to a disk 32 on one side of the diaphragm and is urged away from the valve opening by a spring 33 abutting against one end of the disk 32 and at the other end against a circular member 34 mounted adjacent the wall 21, and bearing against the ends of three adjusting screws 35 which pass through the wall. On the other side of the diaphragm 27 is provided another disk 36 against which bears the cam-shaped end 37 of a float-lever 38 pivoted to the clamping member 31 adjacent the diaphragm and carrying a float 39 at its outer end. As thus constituted, the regulator of our invention comprises two valve chambers 40 and 41, separated by wall 21, and a valve-opening or port therebetween controlled by two valves, one for hand control in chamber 40, and the other for automatic control in chamber 41.

The automatic control is adapted to be accomplished by two agencies, first the pressure on the diaphragm through the open end of the casing 20 connected to the tank, and second the float lever 38, the end of which bears against disk adjacent to diaphragm and exerts a pressure upon it dependent upon the level of the water in the tank.

The operation of the regulator is as follows: The air pump suction pipe 17 is connected to chamber 41, while a suitable opening 42 is provided in the cap 25 to admit air to chamber 40. The regulator spring 33 being adjusted to allow the automatic valve-actuating means to close the valve-opening 22, when the pressure in the tank rises above a certain amount, say thirty pounds per square inch, the air supply of the air pump will be cut off whenever pressure in the tank rises above thirty pounds or such other maximum pressure as the regulator spring may be adjusted to. Whenever pressure falls below thirty pounds and the water level in the tank is such that the float-lever 38 does not exert pressure on the diaphragm, the valve 26 will open as shown diagrammatically in Fig. 4. The water level may be such that the float occupies the position shown in dotted lines in Fig. 2 and does not bear upon the diaphragm, but if the pressure in the tank is still above the amount for which the regulator spring 33 is set, the valve 26 will remain closed and the air supply will be cut off. The moment the pressure falls, however, the valve 26 opens, and the air supply is replenished until the pressure within the tank is renewed, this renewal being accomplished by the injection of both air and water, or by either air or water. Thus the regulator is responsive to pressure variation, and the air supply is automatically regulated. By means of the hand operated closure 24 the regulation may be made more or less prompt as desired, and the air supply adjusted to that best suited to the other conditions of the system, or may be positively shut off. It would seem that the water level float 39 under these conditions has no appreciable effect on the operation of the regulator, but this is on account of the fact that it is designed to operate only under certain conditions. The arms of the float lever are so proportioned with respect to the fulcrum on the clamping member 31, and the float 39 is made of such weight, that when the water recedes from the float, as shown in Fig. 5, and the valve is open, there is insufficient pressure exerted against the diaphragm by the float lever to close the valve. When, however, the pressure has risen to such an amount that the valve is closed by the combined pressure of the air and the float lever, the valve will be held in closed position or locked closed until the water level has risen to such a height as to float the lever, and relieve the pressure of the float lever on the valve, and this irrespective of pressure within the tank. This condition is shown clearly in Fig. 2. Thus it is, that after the water recedes from the float and the air pressure and volume is sufficiently restored, more air can not be pumped into the tank until the water has risen to the level of the float and passed it, as shown in dotted lines in Fig. 2, and diagrammatically in Fig. 4, and not then if the pressure within the tank is sufficient to hold the valve closed, which will be the case if sufficient amount of air for proper working conditions is in the tank. The air is, therefore, effectually limited as to its maximum volume under a definite pressure, and the proportionment of the relative volumes of air and water is maintained such as is most satisfactory for the best working conditions. With a certain volume of air within the tank, as determined by the position of the regulator, it is practically impossible for leakage to be such, when the normal quantity of water is used from the tank, as to diminish the volume of air to so small an amount that it cannot expand sufficiently to work through the proper and effective water-expelling range of expansion. There is, therefore, with the instrumentalities above named, combined as specified, always a certain minimum volume of air in the tank. As air is admitted to the tank only when the pressure in said tank is less than that at which the valve is adjusted to operate; and as each time that the water recedes and allows the float to drop when the valve is in closed position due to excess of pressure against diaphragm, it is securely locked in that position by the float-lever and so remains until the water again rises and elevates the float. This operation, therefore, prevents the volume of air from becoming greater than is desirable for the most satisfactory operation.

While we have shown our regulator attached to the tank about its middle, it is obvious that we may change its position in accordance with conditions. We have found that the location of the regulator at the middle of the tank is very convenient and gives good regulation, especially when installed in the head or shell of a tank which is disposed horizontally, but may readily locate it at other points. So also we may control automatically by the same regulator a by-pass, a delivery pipe, or a starting device, or any means other than the suction pipe of the air supply. And while we have shown the best embodiment of our invention now known to us, we wish it distinctly understood that our invention may be given many forms other than that herein disclosed without departing in anywise from its generic spirit.

What we claim is:—

1. An automatic air regulator for water supply tanks of air pressure systems comprising a means controlling the supply of fluid to the tank which is directly controlled both by air pressure and the level of the water in the tank.

2. An automatic air regulator for the water supply tanks of compressed air systems comprising a means directly controlling the supply of fluid to the tank which is controlled combinedly by the pressure in the tank and the volume of water therein.

3. An automatic air regulator for the water supply tanks of compressed air water supply systems comprising means controlling the supply of fluid to the tank which is directly controlled combinedly by the pressure of the tank and the relative volumes of air and water therein.

4. An automatic air regulator for water supply tanks of air pressure water systems comprising a means controlling the supply of fluid to the tank which is acted upon simultaneously by means responsive to pressure variations, and means responsive to change in water level in the tank.

5. An automatic air regulator for water supply tanks of air pressure systems comprising a means controlling the supply of fluid to the tank which is simultaneously acted upon by means responsive to variations in air pressure, and means responsive to changes in the volume of water in the tank.

6. An automatic air regulator for water supply tanks of air pressure water supply systems comprising means directly controlling the supply of air to the tank controlled both by the pressure of the air in the tank and the level of the water.

7. An automatic air regulator for the water supply tanks of air pressure water supply systems comprising means directly controlling the supply of air to the tanks which is controlled combinedly by the pressure in the tank and the volume of water therein.

8. An automatic air regulator for water supply tanks of air pressure water systems comprising a valve controlling the supply of fluid to the tank, which valve is controlled combinedly by the pressure in the tank and the volume of water therein.

9. An automatic air regulator for the water supply tanks of air pressure systems comprising a valve controlling the air supply to the tank, which valve is controlled combinedly by the pressure in the tank and the volume of water therein.

10. An automatic air regulator for water supply tanks of air pressure systems comprising a casing connected to the tank, a valve opening in said casing associated with the fluid supply to the tank, a valve closure coöperating with said opening, and means responsive to pressure variation within the tank for controlling said valve, and a second valve closure coöperating with the same valve opening for throttling the said opening as desired.

11. An automatic air regulator for water supply tanks of air pressure systems comprising a casing connected to the tank, a valve opening in said casing associated with the fluid supply to the tank, a valve closure coöperating with said opening, and means responsive to pressure variation within the tank for controlling said valve closure, and a hand operated valve closure for throttling said valve opening at will.

12. An automatic air regulator for water supply tanks of air pressure water systems comprising a casing, two valve chambers adjoining each other in said casing, and a valve in each chamber for controlling the fluid supply to said tank, one of said valves being controlled by means responsive to change in tank pressure, and the other of said valves being controlled by hand to vary said fluid supply at will.

13. An air regulator for supply tanks of air pressure water systems comprising a means directly controlling the supply of fluid to the tank which is controlled combinedly by tank pressure and the relative volume of air and water therein.

14. An automatic air regulator for the water supply tanks of air pressure water systems comprising a casing communicating with a tank, two valve chambers adjoining each other in said casing, a valve opening between said chambers, and two valve closures jointly controlling said opening, one of said valve closures being located in one chamber and responsive to variations in tank pressure, and the volume of water in said tank, and the other of said closures being located in the other chamber and adapted for hand control, and means whereby the fluid supply is controlled by said valve.

15. An automatic air regulator for water supply tanks of air pressure systems comprising a means controlling the supply of fluid to the tank which is controlled combinedly by a diaphragm responsive to variations in pressure in the tank, and by a float which moves as the water level in the tank varies.

16. An automatic air regulator for water supply tanks of air pressure systems comprising a means controlling the supply of fluid to the tank which is controlled combinedly by a diaphragm responsive to pressure variations within the tank, and a float, the lever of which float bears with its end against the diaphragm.

17. An automatic air regulator for water supply tanks of air pressure systems comprising a means controlling the supply of fluid to the tank, a casing associated therewith, a diaphragm in said casing for controlling said means in response to variations in tank pressure, a clamping member for the diaphragm, and a float within the tank which is pivoted to the clamping member, the lever of which bears with its end against the diaphragm.

18. An air regulator comprising means for controlling the supply of air to the air pump which supplies air to the pressure tank of a compressed air water supply system, and means responsive to variation in pressure within said tank for controlling said means for controlling the air supply of said pump.

In testimony whereof we have hereunto set our hands in presence of two subscribing witnesses.

WILLIAM A. SHORB.
GUY R. RODGERS.

Witnesses:
 WM. F. BERCHER,
 WALLACE J. CROSS.